United States Patent [19]

Bennitt et al.

[11] Patent Number: 4,872,395
[45] Date of Patent: Oct. 10, 1989

[54] CROSSHEAD PER SE, AND IN COMBINATION WITH A CONNECTING ROD ASSEMBLY AND A PISTON ROD

[75] Inventors: Robert A. Bennitt; Alan C. Anderson, both of Painted Post, N.Y.

[73] Assignee: Dresser-Rand Company, Painted Post, N.Y.

[21] Appl. No.: 124,266

[22] Filed: Nov. 23, 1987

[51] Int. Cl.[4] .................. F01B 9/00; F16J 15/18; F16H 21/22
[52] U.S. Cl. .................. 92/139; 92/165 R; 92/158; 74/44; 74/49; 74/45; 384/11; 184/5; 403/152
[58] Field of Search .............. 92/165 R, 129, 139, 92/176; 74/44, 49, 45; 123/74 AC, 197 AB, 197 AC; 184/5; 384/11; 403/116, 117, 151, 152

[56] References Cited

U.S. PATENT DOCUMENTS

| | | | |
|---|---|---|---|
| 415,438 | 11/1889 | Birdsall | 384/11 |
| 727,739 | 5/1903 | Blanding | 384/11 |
| 1,440,747 | 1/1923 | Rogatchoff | 184/5 |
| 1,444,924 | 2/1923 | Larsh | 184/5 |
| 1,789,089 | 6/1929 | Tobler | 403/152 |
| 1,803,749 | 5/1931 | Demarest | 384/11 |
| 1,841,478 | 1/1932 | Highleyman | 384/11 |
| 2,057,158 | 10/1936 | Moffitt | 92/139 |
| 2,250,492 | 7/1941 | Miller | 92/189 |
| 2,463,174 | 3/1949 | Hasselberg | 123/197 AC |
| 2,682,433 | 6/1954 | Maier | 384/11 |
| 2,907,609 | 10/1959 | Wright et al. | 384/11 |
| 3,179,451 | 4/1965 | Blank | 403/152 |
| 3,877,350 | 4/1975 | Earley et al. | 403/152 |
| 4,566,370 | 1/1986 | Hanafi | 74/44 |
| 4,593,608 | 6/1986 | Corey et al. | 92/176 |
| 4,593,660 | 6/1986 | Elsbett et al. | 92/165 R |
| 4,699,036 | 10/1987 | Henne | 74/44 |
| 4,729,249 | 3/1988 | Besic | 92/165 R |
| 4,762,051 | 8/1988 | Besic et al. | 74/44 |
| 4,805,518 | 2/1989 | Heban, Jr. | 92/189 |

FOREIGN PATENT DOCUMENTS

| | | | |
|---|---|---|---|
| 0054644 | 12/1890 | Fed. Rep. of Germany | 384/11 |
| 0477438 | 6/1929 | Fed. Rep. of Germany | 384/11 |
| 1251591 | 10/1967 | Fed. Rep. of Germany | 92/165 |
| 1264882 | 3/1968 | Fed. Rep. of Germany | 384/11 |
| 2151184 | 4/1973 | Fed. Rep. of Germany | 92/187 |
| 833509 | 10/1938 | France | 92/139 |
| 984866 | 7/1951 | France | 92/189 |
| 1369205 | 6/1964 | France | 403/152 |
| 558337 | 2/1957 | Italy | 92/139 |
| 0318742 | 1/1972 | U.S.S.R. | 184/5 |
| 0006742 | 5/1888 | United Kingdom | 381/11 |
| 1148398 | 4/1969 | United Kingdom | 92/165 |

Primary Examiner—Robert E. Garrett
Assistant Examiner—Thomas Denion
Attorney, Agent, or Firm—B. J. Murphy

[57] ABSTRACT

The crosshead has a body formed of solid, metal plate, and of substantially U-shape. It comprises a pair of spaced-apart parallel limbs which are bridged between by an integral transverse member, and the latter is bored through to receive a piston rod therein. Shoe plates are joined to the limbs to guide the body in reciprocation. In the combination with a connecting rod assembly and a piston rod, an end of the piston rod is directly fastened to the connecting rod assembly, and the crosshead is coupled to an intermediate portion of the piston rod.

8 Claims, 1 Drawing Sheet

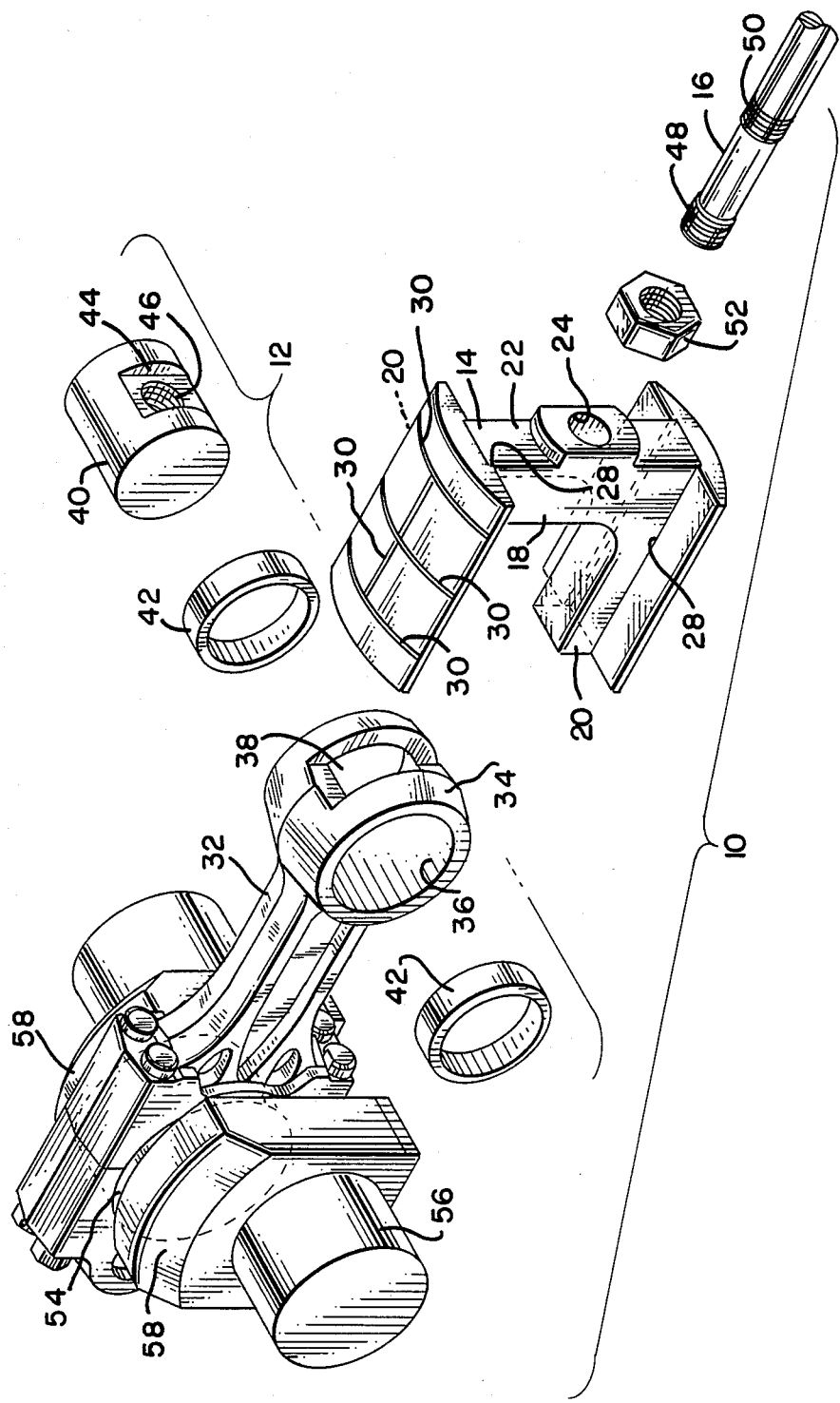

CROSSHEAD PER SE, AND IN COMBINATION WITH A CONNECTING ROD ASSEMBLY AND A PISTON ROD

This invention pertains to crossheads, such as are used in reciprocating machinery, viz., pumps, gas compressors, engines, and the like, and in particular to a novel crosshead, per se, and in combination with a connecting rod assembly and a piston rod, (a) of simple manufacture, greater service life, and exhibiting less inertia, weight and friction, and (b) which accommodates for direct coupling, hence direct load transfer, between the piston rod and the connecting rod assembly.

Crossheads known in the prior art are commonly a principal source of machine failure, unwarranted inertia, excessive friction, and undue weight. Accordingly, it is an object of this invention to set forth the aforesaid novel crosshead, per se, and in the aforesaid combination, to avoid or minimize the cited disadvantages of prior art crossheads.

It is particularly an object of this invention to set forth a crosshead comprising a body formed of solid, metal plate, i.e., from a plat plate of uniform thickness; said body having a pair of space-apart, substantially parallel limbs, and a single, transverse member integral with, and bridging between said limbs; wherein said transverse member has a borehole formed therethrough in which to receive a piston rod; and further including shoe plates joined to said limbs.

Further is it an object of this invention to teach the combination of a connecting rod assembly, a crosshead, and a piston rod comprising a crosshead body formed of solid flat, uniform thickness, metal plate; said body having a pair of spaced-apart, substantially parallel limbs, and a single, transverse member integral with, and bridging between said limbs; wherein said transverse member has a borehole formed therein through which to receive a piston rod; and a connecting rod; wherein said connecting rod has a given hollow end formed of a substantially barrel-shaped wall; said wall has an opening formed therethrough; said transverse member is set in said opening; and further including a crosshead pin, disposed within said wall, having a tapped hole formed therein; and a piston rod in penetration of said borehole and having a threaded end threadedly engaged with said tapped hole.

Further objects of this invention, as well as the novel features thereof, will become more apparent by reference to the following description taken in conjunction with the accompanying FIGURE, the same being an exploded-view and perspective illustration of an embodiment of the invention.

As shown in the FIGURE, the aforesaid combination 10 comprises a connecting rod assembly 12, a crosshead 14, and a piston rod 16. The crosshead 14 has a body 18, formed of solid, flat, metal plate of uniform thickness, having a pair of spaced-apart, substantially parallel limbs 20 (only one being visible, but the other being a mirror image thereof), and a single, transverse member 22 integral with, and bridging between the limbs 20.

Member 22 has a borehole 24 formed therethrough in which to accommodate a portion of the piston rod 16. Borehole 24 is unthreaded and, as shown, is the only penetration of the crosshead 14; it only slidably receives the rod 16. Shoe plates 26 have rectilinear grooves 28 formed therein, in flat, innermost surfaces thereof, in which, as keyways, to receive portions of the limbs 20. Too, the shoe plates 26, provided for guiding the crosshead 14 in its reciprocation, have lubrication grooves 30 in the outermost, arcuate surfaces thereof. Bolts (not shown) secure the shoe plates 26 to the limbs 20.

The connecting rod 32 has a hollow end 34 formed of a substantially barrel-shaped wall 36, and the wall has an opening 38 formed in a sector thereof. A crosshead pin 40 is received in end 34 and is journalled, in interpositioned sleeve bearings 42, at opposite ends thereof. Pin 40 has a slot 44 formed through a sector thereof, which aligns with the opening 38 in wall 36. Too, a tapped hole 46 is formed in the pin 40 in the center of the slot.

The transverse member 22 enters the opening 38 and sets into the slot 44; in turn, a threaded end 48 of the piston rod 16 is threadedly received in the tapped hole 46 in pin.

An intermediate portion of piston rod 16 has a threaded shoulder 50 to receive a lock nut 52 for snubbing the crosshead 14 up tight against the slot 44.

In a manner well known, and not relevant to the instant invention, the connecting rod 32 is fastened to a crank 54 of a crankshaft 56 which has crankthrows 58 integral therewith.

Use of this invention provides for a more direct load transfer between the connecting rod 32 and the piston rod 16. The invention provides for an improvement in the basic mechanical efficiency of frame and running gear due to the reduction in weight of the crosshead 14 and, therefore, a reduction in friction arising therefrom. The invention can be used to retrofit existing engines and compressors with minimal changes, and its serviceability is enhanced due to a reduction of parts required therefor and reduction in the overall weight of the novel combination. The invention allows for an increase in operating speed of machines which are currently inertia limited, due to the reduction of inertia normally attributed to the crosshead. Too, clearly, the use of this novel design, comprising a crosshead body 18 formed of, that is, cut form solid flat, uniform thickness, metal plate, will eliminate problems associated with prior art crosshead castings, (i.e., material quality, cracking and sand inclusions).

While we have described our invention in connection with a specific embodiment thereof, it is to be clearly understood that this is done only by way of example, and not as a limitation to the scope of our invention as set forth in the objects thereof and in the appended claims.

We claim:

1. A crosshead, comprising:
   a body formed of solid, flat, metal plate of uniform thickness;
   said body having a pair of spaced-apart, substantially parallel limbs, and a single transverse member integral with, and bridging between said limbs; wherein
   said limbs, as aforesaid, are solid, of said uniform thickness, and devoid of any throughgoing boreholes;
   said transverse member has a borehole formed therethrough in which, slidably, to receive a piston rod; and further including
   shoe plates joined to said limbs 8.

2. A crosshead, according to claim 1, wherein:
   said shoe plates have rectilinear grooves formed therein; and
   portion of said limbs are set in said grooves.

3. A crosshead, according to claim 1, wherein:
said shoe plates have arcuate surfaces; and
said arcuate surfaces are interrupted by lubrication channels.

4. A crosshead, according to claim 1, wherein said shoe plates have a width considerably greater than said uniform thickness.

5. In combination, a connecting rod assembly, and a piston rod, comprising:
 a crosshead body formed of solid flat, metal plate of uniform thickness;
 said body having a pair of spaced-apart, substantially parallel limbs, and a single, transverse member integral with, and bridging between said limbs; wherein
 said limbs, as aforesaid, are solid, of said uniform thickness, and devoid of any throughgoing boreholes;
 said transverse member has a borehole formed therein through which to receive a piston rod; and
 a connecting rod; wherein
 said connecting rod has a given, hollow end formed of a substantially barrel-shaped wall;
 said wall has an opening formed therethrough
 said transverse member is set in said opening; and further including
 a crosshead pin, disposed within said wall, having a tapped hole formed therein; and
 a piston rod in slidable penetration of said borehole and having a threaded end threadedly engaged with said tapped hole.

6. The combination, according to claim 5, wherein:
said pin has a recess formed in a surface thereof; and
said transverse member is set in said recess.

7. The combination, according to claim 6, wherein:
said tapped hole opens onto said recess.

8. In combination, a connecting rod assembly, a crosshead, and a piston rod, comprising:
 a crosshead body having only a single borehole formed therein and therethrough;
 a connecting rod assembly; and
 a piston rod in slidable penetration of said borehole and having an end fastened directly to said connecting rod assembly.

* * * * *